United States Patent [19]

Mortensen et al.

[11] Patent Number: 5,740,202
[45] Date of Patent: Apr. 14, 1998

[54] METHOD AND APPARATUS FOR DIGITALLY EVALUATING THE PHASE OF A MODULATED CARRIER

[75] Inventors: Ivar Mortensen, Toulouse; Marie-Laure Boucheret, Goyrans; Henri Favaro, Sainte Foy d'aigrefeuille; Eric Belis, Toulouse, all of France

[73] Assignee: France Telecom, Paris, France

[21] Appl. No.: 532,454

[22] Filed: Sep. 22, 1995

[30] Foreign Application Priority Data

Sep. 23, 1994 [FR] France ................... 94-11389

[51] Int. Cl.⁶ .................. H04L 27/14; H04L 27/16; H04L 27/22
[52] U.S. Cl. .................. 375/326; 375/332; 329/304
[58] Field of Search ................... 375/279, 280, 375/281, 283, 284, 326, 329, 331, 332; 329/304, 306

[56] References Cited

U.S. PATENT DOCUMENTS

| 5,260,974 | 11/1993 | Johnson et al. | 375/340 |
| 5,297,172 | 3/1994 | Shenoy et al. | 375/376 |
| 5,440,265 | 8/1995 | Cochran et al. | 375/324 |
| 5,638,406 | 6/1997 | Sogabe | 375/326 |

FOREIGN PATENT DOCUMENTS 0200271  11/1986  European Pat. Off. .
0252500  1/1988  European Pat. Off. .

OTHER PUBLICATIONS

Electronics And Communications In Japan, vol. 67–B, No. 5, Jan. '84, New York, U.S. Namiki "Block demodulation for short radio packet" Figs. 5, 6.

1988 IEEE International Symposium On Circuits And Systems, Jun. 7, '88–Jun. 9, '88, Espoo, FI, pp. 1815–1818, Eglin et al. "Digital implementation of a coherent CPM system for mobile radio", Figs. 2, 3.

*Primary Examiner*—Don N. Vo
*Attorney, Agent, or Firm*—Larson & Taylor

[57] ABSTRACT

The method makes it possible digitally to evaluate the phase of any carrier that has been subjected to rPSK modulation subsequent to clock recovery, sampling, and digitizing the in-phase and quadrature components of the samples, by processing that is performed in polar coordinates and that comprises reducing the range over which the phase of each sample is defined to a range of $+\pi/r$ to $-\pi/r$ and then seeking the center of gravity over $2^N$ successive samples (N being an integer) by performing successive averaging calculations, each time on two values, in application of an N-stage tree structure. Each average of two values is associated with an index indicative of the degree of reliability of the average, and those averages which are associated with a small reliability index are ignored while calculating subsequent averages in the tree structure.

9 Claims, 4 Drawing Sheets

FIG.1. BAR($\varphi_1, \varphi_2$)

METHOD AND APPARATUS FOR DIGITALLY EVALUATING THE PHASE OF A MODULATED CARRIER

BACKGROUND OF THE INVENTION

The invention relates to methods of digitally evaluating the phase of a carrier, and it has a major application in systems for coherent demodulation of phase modulated signals, i.e. in particular "PSK" signals (for phase shift keyed).

Coherent demodulation of signals transmitted by phase modulation of a carrier requires both the clock frequency and the phase of the carrier to be recovered. In addition, it is more and more desirable to perform signal processing in digital manner from a point that is as far upstream as possible, in particular to take advantage of the progress that has been achieved in the implementation of digital systems, of the speeds that can be reached by hard-wired circuits or circuits implemented in the form of application-specific integrated circuits, and of the ease of reconfiguration that they make possible.

To this end, the following method has already been developed whereby, after clock recovery, sampling, and digitizing in-phase and quadrature coordinates of the samples, signal processing is performed in polar coordinates, comprising eliminating the modulation by reducing the range over which the phase of each sample can vary to a range of $+\pi/r$ to $-\pi/r$ (r being the number of phase states used by the modulation); and thereafter, seeking the center of gravity over a group of $2^N$ consecutive samples (where N is an integer). During this search successive averaging calculations are performed, each time on two adjacent values in application of an N-step converging tree structure. Phase correction is then performed on the $2^N$ successive symbols by using the average phase value as obtained over the $2^N$ symbols, and so on for the following groups.

That method which is described in a communication by M. L. Boucheret et al. entitled "A new algorithm for non-linear estimation for PSK-modulated carrier phase", Proceedings of ECSC3, Manchester, November 1993, has the advantage over the conventional estimation method of A. J. Viterbi and A. M. Viterbi (IEEE Trans. on Information Theory, Vol. IT-29, 543–551) of being much easier to implement in hardware form, in particular when using 2s complement arithmetic.

However, because the search for the center of gravity is performed in taking equal account of all of the $2^N$ samples, the presence of a single sample that is severely affected by phase noise can considerably disturb the estimated center of gravity and consequently the demodulation of $2^N$ successive symbols.

SUMMARY OF THE INVENTION

A first object of the invention is consequently to reduce or eliminate the influence of samples that may be subject to excessive phase noise, but without thereby greatly increasing the complexity of the method or of the apparatus.

To this end, the invention provides a method of the kind defined above in which each average of two values is associated with an index (generally in the form of a single additional bit) indicating the degree of reliability of the average, and when calculating subsequent averages in the tree structure, those averages which are associated with a low reliability index are ignored.

It would be possible merely to give smaller weight to an average of two values that has a low reliability index. However, in general that method of proceeding would give rise to so much complexity that it should be set aside in favor of purely and simply rejecting doubtful averages.

Various criteria can be used for allocating the reliability index. Examples of criteria are given below.

As mentioned above, in the method of the article by M. L. Boucheret et al., the same carrier phase value as estimated on a group of $2^N$ samples is used to demodulate all of the symbols within the group. A new estimate is calculated and used for the following group.

That approach is satisfactory so long as the carrier frequency varies relatively slowly. In contrast, the performance of the method disclosed in the above-mentioned article by M. L. Boucheret et al. falls off if the carrier has large frequency variations.

The invention also provides a method for taking that risk into account, and advantageously usable in combination with the above measures, even though it can also be used on its own; according to this method, to demodulate two successive symbols each represented by one sample, use is made of a carrier phase average obtained by seeking the center of gravity of the carrier phases during the transmission of substantially equal numbers of earlier and later symbols.

The invention also proposes apparatus for digitally evaluating the phase of a phase modulated carrier, enabling the above methods to be implemented.

The invention will be better understood on reading the following description of particular embodiments, given as non-limiting examples. The description refers to the accompanying drawings.

BRIEF DESCRIPTION OF THE DRAWINGS

FIG. 1 shows how the average $\phi_x$ is calculated of two input phases $\phi'_1$ and $\phi'_2$ as reduced to the range $[-\pi/4, +\pi/4]$ (function BAR);

DETAILED DESCRIPTION OF PREFERRED EMBODIMENTS

Figure 2:
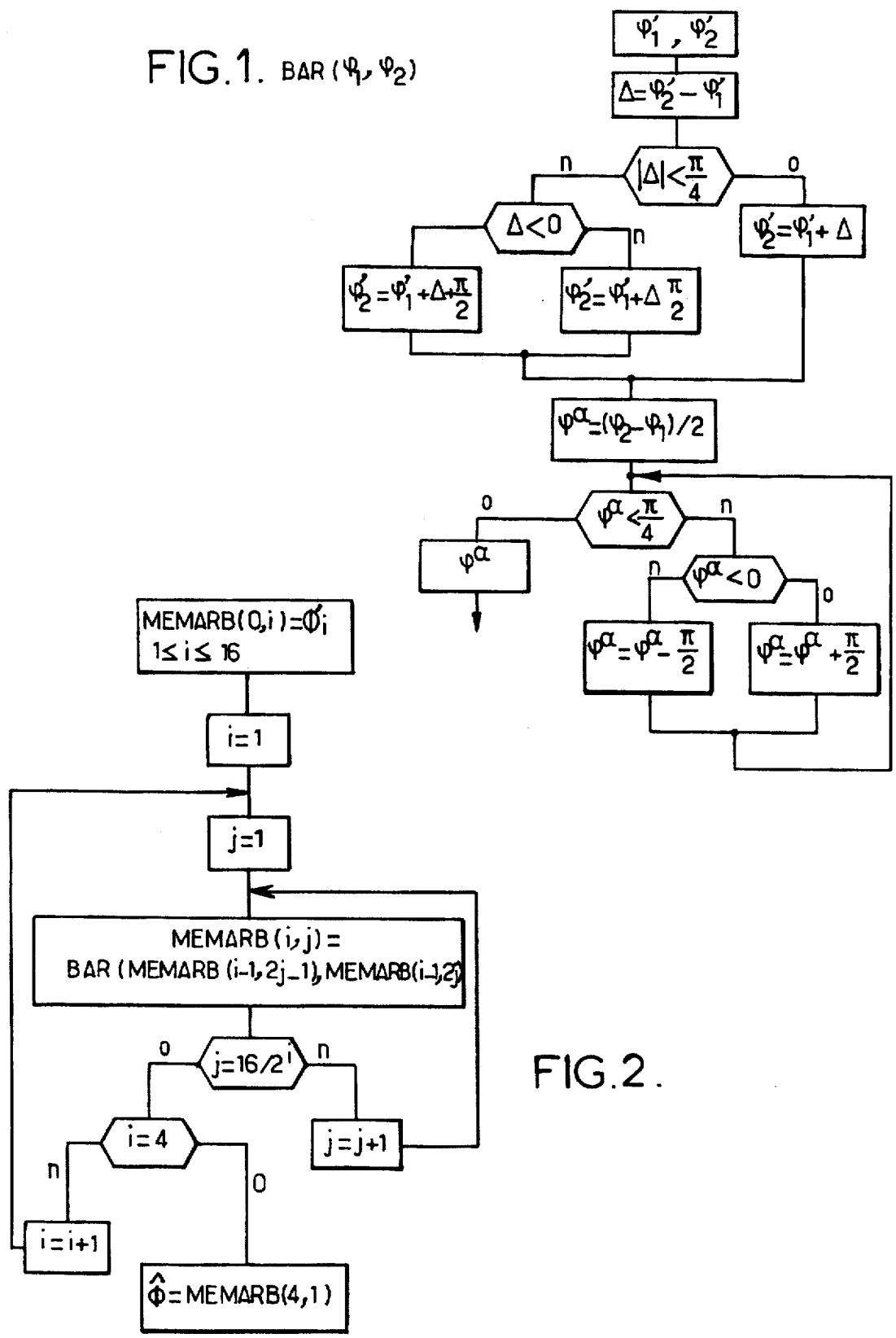
FIG. 2 is a flow chart showing how the center of gravity calculation is implemented using the BAR algorithm of FIG. 1.

Initially the method of estimating the phase of a carrier by calculating its center of gravity is recalled with reference to FIGS. 1 and 2. A more complete description is given thereof in the above-mentioned article by M. L. Boucheret et al., to which reference may be made.

The received signal is initially filtered, sampled, and digitized by a conventional process. Thereafter, the in-phase and quadrature components of the samples are processed at the symbol of frequency and the modulation is eliminated by reducing the range over which the original phases φ are defined to the range $[-\pi/4, +\pi/4]$. The resulting values φ' are stored for a group of $2^N$ samples. Because direct calculation of an average by adding the values φ' in pairs and then dividing by two can, in certain circumstances give rise to a wrong result, each input φ pair is initially subjected to a function referred to herein as BAR, and shown diagrammatically in FIG. 1.

Once all of the input phase values φ have been reduced to the range $-\pi/4, +\pi/4$, the $2^N$ values of φ' lying in the range $-\pi/4$ to $+\pi/4$ are added together in pairs.

FIG. 1 shows how to obtain an average from two values $\phi_1$ and $\phi_2$. $2^{N-1}$ averages are obtained from the $2^N$ input phases.

Figure 4:
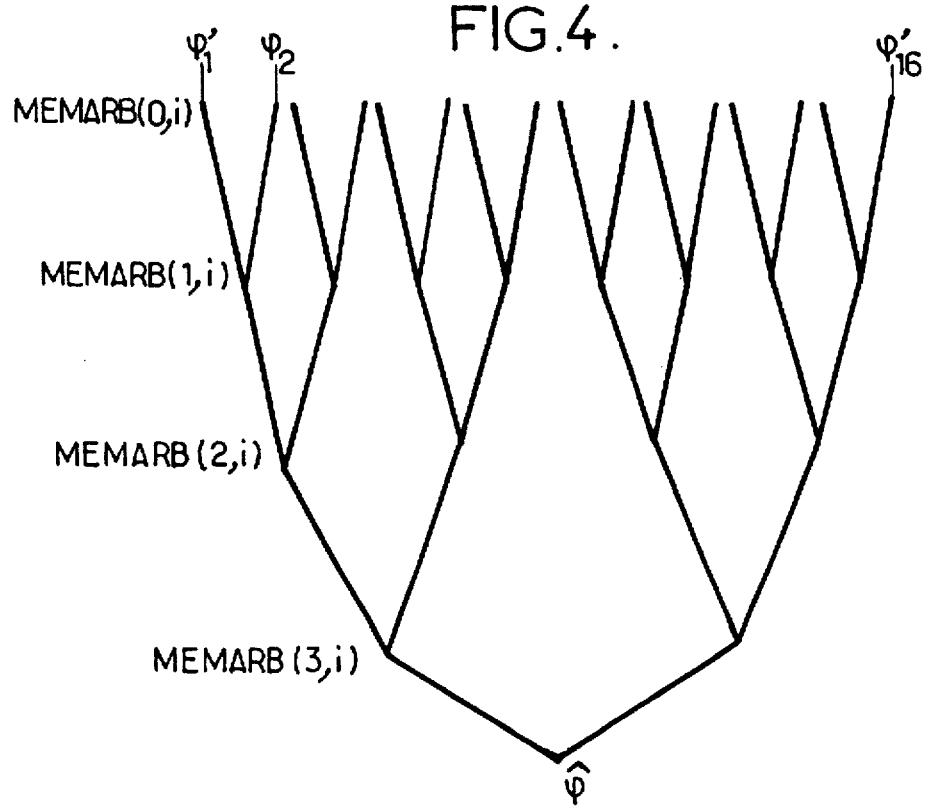
FIG. 4 shows the calculation tree structure for applying the invention.

FIG. 4 shows the tree structure used.

The center of gravity is then determined by the algorithm shown diagrammatically in FIG. 2. In this algorithm, the operation shown in FIG. 1 is called BAR. The $2^N$ values that have been reduced to the range $[-\pi/4, +\pi/4]$ and then stored, are referenced MEMARB (O, i) where i lies in the range 1 to $2^N$.

The example shown in FIG. 2 corresponds to $2^N=16$. The tree structure then has four successive stages. In FIG. 2, MEMARB (j, i) designates the i-th value obtained after the j-th summing step.

Since the group has $2^N=16$ samples, the estimated value for the phase can be written ψ MEMARB (j=4, i=1) at the end of the steps shown in FIG. 4.

In a first aspect of the invention, each MEMARB average of two phases is associated with a reliability bit which, depending on its value, gives rise to that value either being taken into account or being erased in the subsequent calculation. This leads to the function BAR shown in FIGS. 1 and 2 being modified to provide a function 10 referred to as SEBAR and shown in FIG. 3, in which the additional bit allocated to two input values is referenced $B_1$ or $B_2$, respectively for phases $\phi'_1$ and $\phi'_2$. A function EBAR internal to SEBAR implements an algorithm that may be as given below for the purpose of generating the reliability bit B' associated with the average φ', which algorithm is based on the two reliability bits $B_1$ and $B_2$ corresponding to the phases $\phi'_1$ and $\phi'_2$, and to the difference $\Delta=|\phi'_1-\phi'_2|$. The algorithm may be as follows:

B'=0 if $B_1=0$ and $B_2=0$, or if the absolute value of Δ is greater than S, where S is a predetermined threshold; otherwise B'=1 in all other cases.

In other words, the erasure bit B' is given the value 0 if:

the angular distance Δ between two phase values $\phi'_1$ and $\phi'_2$ is greater than a threshold S, which threshold is selected, in particular, as a function of the number of states possible in the modulation used, and also as a function of other parameters, e.g. the acceptable equipment complexity; or if both of the erasure bits associated with the two phases whose sum is being calculated are equal to 0;

where the first case is indicative of lack of reliability on at least one of the two phases.

On principle, the reliability bits associated with the $2^N$ original phases can be set to the value 1.

For 4PSK modulation, a value $S=3\pi/16$ generally gives satisfactory results. For modulation using a larger number of phase states, e.g. 8PSK or 16PSK, it is necessary to use a smaller threshold value.

Figure 3:
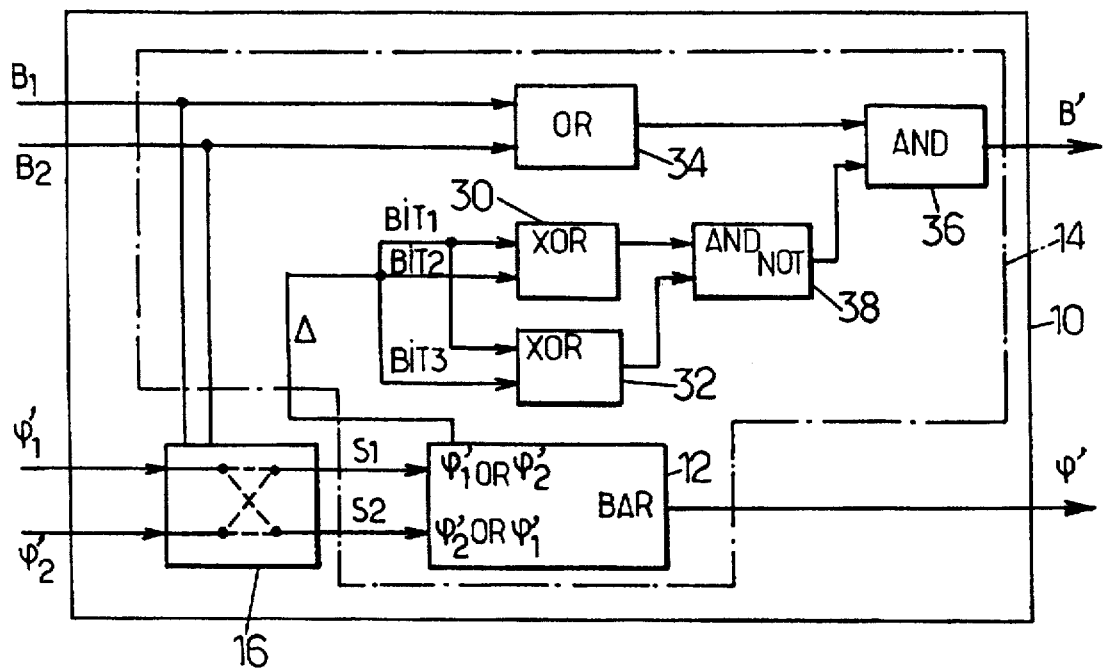
FIG. 3 is a block diagram showing additional algorithms used in implementing the invention in respect of 4PSK with a threshold equal to $3\pi/16$.

EBAR function 14 serves to generate reliability bits. The use of these bits implies adding erasure means to implement a function called SEBAR. In the example of FIG. 3, the SEBAR function is performed by a module 10 that incorporates means 12 for performing the above-described BAR function, a circuit 14 (or software module) for generating B' from $B_1$, $B_2$, and Δ, and an erasure or substitution module 16.

Figure 5:
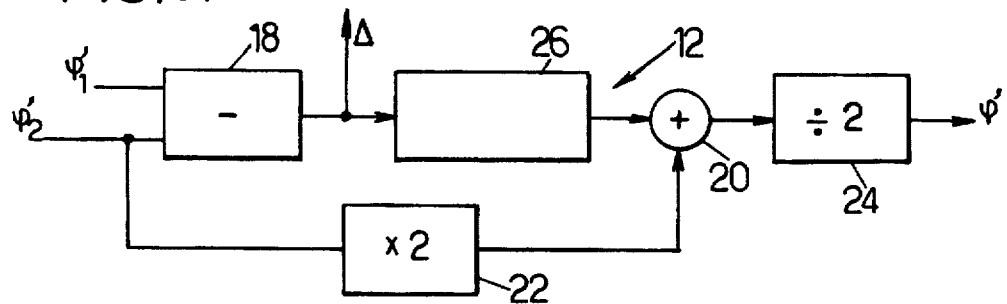
FIG. 5 is a block diagram of a circuit for estimating the average for use with 4PSK modulation with N=16 and implementing the BAR function in 2s complement arithmetic.

The erasure module has two data inputs $\phi'_1$ and $\phi'_2$ and two outputs $S_1$ and $S_2$, and it uses the bits $B_1$ and $B_2$ as control bits. It performs the operation:

If:

$B_1=1, S_1=\phi'_1$
$B_1=0, S_1=\phi'_2$
$B_2=1, S_2=\phi'_2$
$B_2=0, S_2=\phi'_1$ The function BAR can be implemented as shown in FIG. 5 using two adders 18 and 20 and three elementary functions: multiplication by two 22 (which is merely a shift to the left in base 2 arithmetic); division by two 24 (which is merely a shift to the right); and sign extension 26.

The output of adder 18 provides Δ: to perform comparison with a threshold, it suffices in general to conserve only the most significant bits (e.g. the three most significant bits in the example shown).

If the values $\phi'_1$ and $\phi'_2$ are quantified on n bits, then the adder 18 has an n-bit output and does not take borrowing into account. The adder 20 then has two n+1 bit inputs and an n+1 bit output (2s complement arithmetic); it likewise does not take borrowing into account. The output φ' is quantified on n bits, by removing the least significant bit LSB.

In addition to the components for performing the function BAR, the function EBAR (FIG. 3) requires components necessary for performing an additional function; there are five such components in the example shown in FIG. 3. Each of these components performs an elementary function on a single bit. They comprise:

two EXCLUSIVE OR gates 30 and 32;

an OR gate 34 which receives $B_1$ and $B_2$ and which provides an output bit equal to 1 if at least one of the reliability bits $B_1$ and $B_2$ is equal to 1, and which supplies an output bit equal to 0 if both reliability bits $B_1$ and $B_2$ are equal to 0;

a NAND gate 38 which receives the outputs from the gates 30 and 32; and an output AND gate 36.

An estimate for groups of $2^N=16$ samples then takes place as follows.

The input of the estimator receives the 16 phase values $\phi'_1, \ldots, \phi'_{16}$, each of which has a confidence or reliability bit B associated therewith which is equal to 1.

These values are advantageously represented in 2s complement form when the functions are to be implemented as an application specific integrated circuit (ASIC). If the carrier has 4PSK modulation, then the modulation is eliminated by removing the two most significant bits.

In the example shown in FIG. 3, the threshold for determining the confidence bit is equal to $3\pi/16$, which is well adapted to 4PSK modulation and to implementation. Physically this is done by the gates 30, 32, and 38. For this purpose, the gate 30 receives the most significant bits 1 and 2 of Δ while the gate 32 receives the bits 2 and 3.

Some other combinational logic could be used to implement a different threshold simply.

Depending on the desired speed, calculations are performed in series or in parallel. Depending on the form of calculation adopted, the circuit 10 shown in FIG. 3 will either be provided as a single unit with time multiplexing and storage of intermediate results, or, at the most, in as many units as there are nodes in the tree structure. Intermediate configurations are possible. In addition, the gates 34 and 36 can be omitted in the first stage.

As mentioned above, the use of a common estimate of the average of the phases for all of the symbols within the same group or block degrades the performance of the center of gravity algorithm if frequency instability is present. For example, if the averaging is performed over $2^N=16$ values, the use of the same average from the first to the sixteenth symbol has unfavorable consequences in the event of a rapid change in frequency within the period during which the group of symbols was transmitted.

The invention also proposes a method and apparatus for estimating phase that retains the center of gravity calculation but does so with a "moving" average, where the word "moving" means that the average used for demodulating any one symbol is derived from the phases of the carrier during transmission both of earlier symbols and of later symbols, and this is done without significantly complicating implementation of the method.

An optimum result is obtained when using a number of earlier symbols that is substantially equal to the number of later symbols used. For example, when estimation is performed as an average over 16 values, the symbols of order i to i+15 are used for demodulating the symbol i+7, then the phases of i+1 to i+16 are used for demodulating the symbol i+8, and so on.

It is assumed below that a moving average is to be taken over $m=2^N$ samples, which are referenced 2k+1, 2k+2, ..., 2k+m, where k is an integer whose initial value is zero and which is incremented by one for each new moving average. The letter j is used to designate the sample of the phase of a symbol $S_j$.

The average is calculated in this case also by using an N-stage tree structure. Each estimate applicable to two successive samples requires $2^N-1$ performances of the above-defined SEBAR function. However, many of the intermediate computations required for estimating the average that is to be used in decoding two successive samples have already been performed while estimating the corresponding average for the two preceding samples.

Figure 6:
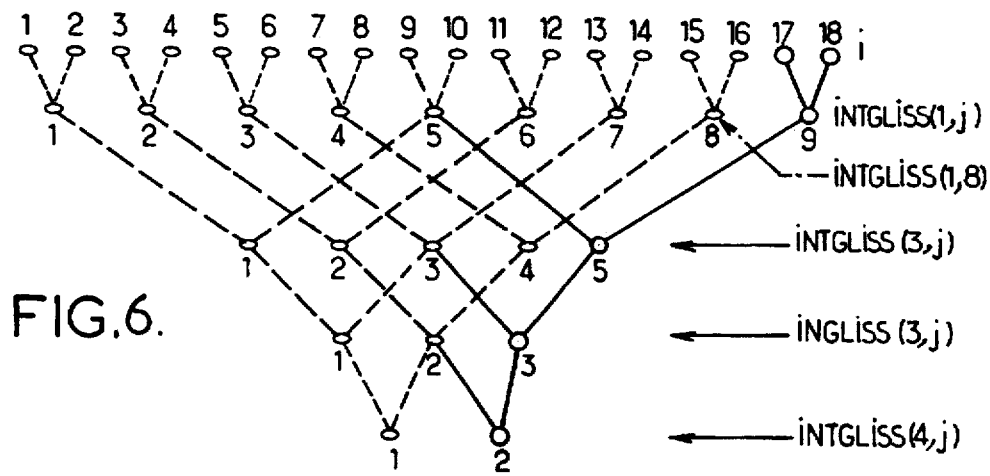
FIG. 6 shows a modification of the FIG. 4 tree structure making it possible to use moving averages, thereby reducing the influence of frequency variations.

This observation which makes it possible to reduce the increase in complexity, as is essential for implementing this aspect of the invention, can be seen in FIG. 6 which shows a tree structure that makes simplification possible. In this figure, the structure represented by dashed lines corresponds to estimating phase for symbols 8 and 9 when $2^N=16$. The additional calculations needed to estimate phase as used for the next two samples 10 and 11 are represented by uninterrupted lines.

More generally, if each partial result is referenced intgliss (i, j) where i is the stage number in the tree (i ranging from 1 to N), and j is the number of the partial result in the stage under consideration (j ranging from k+1 to k+m/$2^i$), then successive determinations are performed using the following functions:

intgliss(1,j)=SEBAR(2j−1,2j), intgliss(i, j)=SESAR[intgliss(i−1,j), intgliss(i−1,j+(m/$2^i$))
], for i ranging from 2 to N.

The final value intgliss(N,k+1) constitutes an estimate of the phase of the carrier. It is used for demodulating two successive symbols $S_{2k+(m/2)}$ and $S_{2k+m/2+1}$.

Of the m−1 calculations necessary for these two symbols, most have already been performed while estimating the phase used for the two preceding symbols, so it suffices to calculate only N new SEBAR functions, rather than m−1 such functions.

By "moving" two symbols at a time, rather than only one, each new calculation has little effect on performance, even though it provides a considerable saving in hardware complexity.

In the example of FIG. 6, where $2^N=16$, it can be seen that the tree structure is different from that of FIG. 4. For example:

intgliss(1,8)=SEBAR[15,16], intgliss(2,3)=SEBAR[intgliss(1,3),intgliss(1,7)].

The final value intgliss(4,1) is used for demodulating the symbols $S_8$ and $S_9$.

With a moving average, it is necessary to calculate another estimate of the carrier phase to demodulate the symbols $S_{10}$ and $S_{11}$, this time on the basis of phase samples referenced 3, 4, ..., 17, 18 in FIG. 6.

Thus, intgliss(1,1) is dropped in favor of intgliss(1,8).

Of the fifteen averages to be calculated, eleven have already been determined while calculating intgliss(4,1). Only four calculations still need to be performed:

intgliss(1,9)=SEBAR[i=17,18]

intgliss(2,5)=SEBAR[intgliss(1,5),intgliss(1,9)]

intgliss(3,3)=SEBAR[intgliss(2,3),intgliss(2,5)]

intgliss(4,2)=SEBAR[intgliss(3,2),intgliss(3,3)]

More precisely, for arbitrary values of $m=2^N$ and of k, to determine a phase estimate, it is necessary to compute the function SEBAR:

m−1 times for the first complete estimate; and

N times for each successive estimate.

Figure 7:
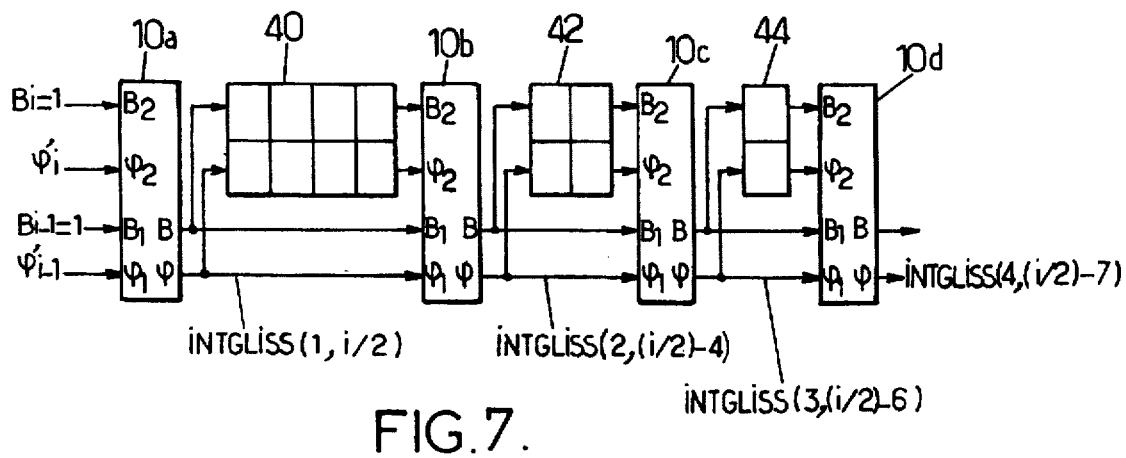
FIG. 7 is a block diagram of apparatus for implementing the invention using a moving average.

By way of example, the tree structure for calculating a moving average on 16 samples may be implemented as shown in FIG. 7, in which the function SEBAR is present on four stages and where calculations are performed in parallel on the various stages and at the same clock frequency.

The structure of FIG. 7 has four SEBAR stages 10a, 10b, 10c, and 10d. Between the stages 10a and 10b, the following intermediate results:

intgliss(1, (i/2)−4)

intgliss(1, (i/2)−3)

intgliss(1, (i/2)−2)

intgliss(1, (i/2)−1)

are stored in successive cells of a first-in first-out (FIFO) memory 40 made up of shift registers Similarly, the intermediate results intgliss(2, (i/1)−5)

intgliss(2, (i/2)−6)

are stored temporarily in a memory 42 between stages 10b and 10c.

Finally, a last memory stores temporarily intgliss(3, (i/2) −7) between stages 10c and 10d.

Depending on the required speed, which itself depends on the symbol of frequency, an implementation will make use of a greater or smaller number of operations in parallel or in time sharing, and will therefore require a greater or smaller number of gates.

Figure 8:
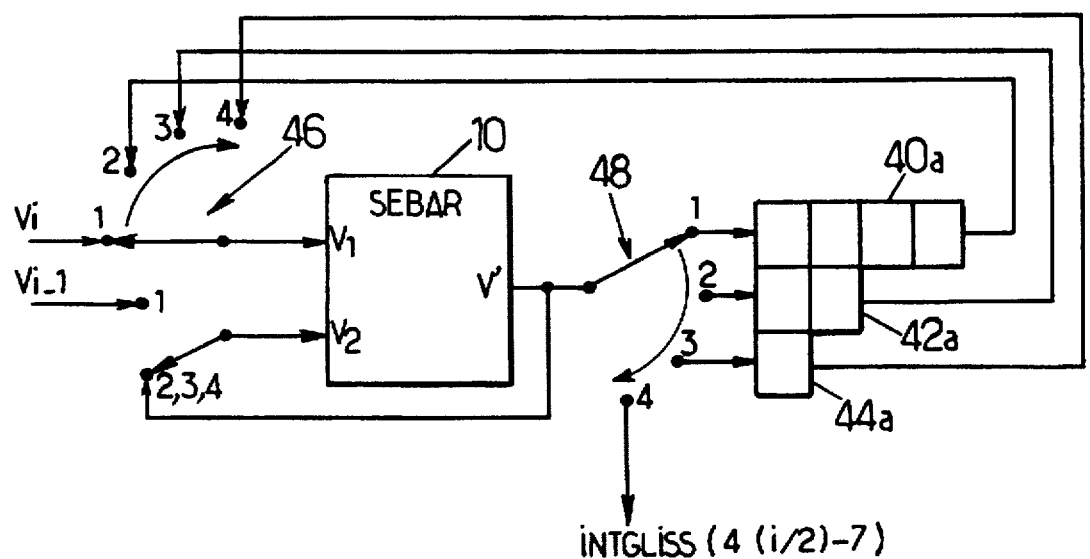
FIG. 8 shows a variant of FIG. 7.

When the stages operate in full time sharing, they can make use of a single SEBAR function and they can have the structure shown in FIG. 8 where $V_i$ (or $V_{i-1}$) designates the set of two signals $\phi_i$ and $B_i$ (or $\phi_{i-1}$ and $B_{i-1}$). Multiplexers 46 and 48 that are shown as switches serve to loop back the outputs from the memories 40a, 42a, and 44a to the input $V_1$ and also to feed the memories. A two-input multiplexer 50 serves initially to apply $V_{i-1}$, and then the output from the function SEBAR to the input $V_2$.

In the example shown, the blocks comprise 16 symbols, however some other number would be possible, providing it is a power of two. A confidence bit and moving averages are advantageously used in combination, however either may be used on its own.

We claim:

1. A method of digitally evaluating a phase of an rPSK phase modulated carrier where r is a number of modulation phase states of the carrier, comprising the steps of: recovering a clock of the carrier, sampling said carrier to obtain samples, digitizing in-phase and quadrature coordinates of each of the samples and processing said samples in polar coordinates, said processing including:

reducing a range over which a phase of each sample is defined to a range of from $+\pi/r$ to $-\pi/r$, and performing successive averaging calculations, each time on two phase values, according to an N-step tree structure beginning with $2^N/2$ computations each on a set of two successive said samples until a center of gravity of $2^N$ successive samples, where N is an integer, is obtained, further comprising assigning an index specifying a degree of reliability to each average value resulting from one of said calculations and ignoring those average values which have a reliability index lower than a predetermined reliability threshold in subsequent calculations of average values in the tree structure.

2. A method according to claim 1, wherein said index is a single additional bit having one of values 0 and 1 indicating reliability and the other of the values 0 and 1 indicating lack of reliability.

3. A method according to claim 1, wherein, during each calculation in the tree structure, the reliability index of an average value is given a predetermined value that causes said average value to be ignored in a following calculation in the tree structure whenever:

the reliability indices associated with both input phase values whose average is calculated have said predetermined value; or the difference between the two input phase values exceeds a predetermined threshold.

4. A method according to claim 3, wherein the predetermined difference threshold is $3\pi/16$.

5. A method according to claim 3, wherein, for calculating an output average value of two input average values, one of which has a reliability index that is lower than the predetermined reliability threshold, the other average value is selected as the output average value.

6. A method according to claim 1, wherein, to demodulate each symbol represented by one sample, a carrier phase average is used which is obtained by seeking the center of gravity of carrier phases during transmission of earlier symbols and of later symbols in substantially equal numbers.

7. A method according to claim 6, wherein, for finding the center of gravity of $m=2^N$ samples numbered $2k+1, \ldots, 2k+m$ where k is an integer, use is made of partial results obtained on $2^N$ preceding samples numbered $2k-1, \ldots, 2k+m-2$.

8. A method according to claim 7, including the following steps carried out in succession for finding said center of gravity,:

in a first step, computing m/2 average values, each of a pair of successive samples;

during each following step, computing the average values each of two average values obtained in the step step and separated by m/4, m/8, . . .

until the center of gravity is obtained.

9. A device for digitally evaluating the phase of an rPSK phase modulated carrier, comprising:

means for recovering a carrier clock, for sampling the carrier to obtain samples, and for digitizing in-phase and quadrature coordinates of the samples; means for reducing a range over which a phase of each sample is defined to the range $+\pi/r$ to $-\pi/r$; and means for comprising a center of gravity over $2^N$ successive samples, N being an integer, having means for calculating successive output averages of the two input values, according to an N-step tree structure, means for allocating a reliability index to each output average, said index representative of a degree of reliability of the average responsive to reliability indices of the two input averages and to a difference between the two input averages, and replacement means for replacing one input value having a reliability index that is below a threshold with the other value as an input of the means for calculating an output average from two input values.

* * * * *